United States Patent [19]

Ruxton et al.

[11] 4,392,095
[45] Jul. 5, 1983

[54] METHOD OF AND APPARATUS FOR GENERATING A UNIQUE INDEX MARK FROM THE COMMUTATION SIGNAL OF A D.C. BRUSHLESS MOTOR

[75] Inventors: David S. Ruxton, Bank Crescent; Alex D. Stewart, Cardenden, both of Scotland

[73] Assignee: Rodine Limited, Glenrothes, Scotland

[21] Appl. No.: 391,010

[22] Filed: Jun. 23, 1982

[30] Foreign Application Priority Data

Jun. 30, 1981 [GB] United Kingdom ................. 8120092

[51] Int. Cl.³ .......................................... H02K 29/02
[52] U.S. Cl. ..................................... 318/254; 360/49; 360/72.2
[58] Field of Search .......................... 360/49, 72.2, 51; 318/254 A, 254; 307/106

[56] References Cited

U.S. PATENT DOCUMENTS 3,329,944 7/1967 Leinberger ....................... 340/174.1
3,848,167 11/1974 Ratschmeier et al. ......... 318/254 A
3,851,116 11/1974 Cannon .............................. 360/49 X

FOREIGN PATENT DOCUMENTS 1480468 3/1976 United Kingdom .

Primary Examiner—J. V. Truhe
Assistant Examiner—Patrick Keane
Attorney, Agent, or Firm—Gerald J. Ferguson, Jr.; Joseph J. Baker; C. Lamont Whitham

[57] ABSTRACT

A unique index mark is provided to avoid errors in addressing a memory location on a disk surface by correlating the commutation signal from a d.c. motor with a synchronizing signal present on one or more discrete tracks of the disk. The proportion of the synchronizing signals on one track depends on the number of phases of the d.c. motor although typically with a 2-phase motor one-half of the track contains the synchronizing signal, the other half of the track being erased. The commutation signals and the synchronizing signals are correlated using a microprocessor and a flip-flop. A sensing head looks for a synchronizing signal which is typically 10 individual data blocks of short duration. The detected blocks are counted in each half revolution of the disk, timed from the index edge and comparing the counts in successive half-revolutions in a comparator over several disk revolutions. The microprocesser then identifies from the comparator output the half-revolution of the disk in which the synchronizing signal was recorded. The microprocessor receives the output of the comparator and forces the output of the flip-flop hi setting an initial condition. Thereafter the microprocessor ensures that the flip-flop output is always correlated with the synchronizing signal thereby producing a unique index mark.

4 Claims, 6 Drawing Figures

METHOD OF AND APPARATUS FOR GENERATING A UNIQUE INDEX MARK FROM THE COMMUTATION SIGNAL OF A D.C. BRUSHLESS MOTOR

The present invention relates to a method of, and apparatus for, generating a unique index mark from the commutation signal of a d.c. brushless motor.

In the case of a 2-phase brushless d.c. motor a commutation signal as shown in FIG. 1a is produced every revolution. In a rotating disc memory a unique index mark is required which occurs once per revolution. In order to obtain such a mark the commutation signal as shown in FIG. 1a is divided by 2. However as shown in FIGS. 1b and 1c, two different index signals may be produced, therefore the index mark is not unique.

This provides a problem in the situation where a disk defect exists on a track. If that track is reformatted for any reason the defective part of the track may not be assigned the same address as before if the index pulse is not unique because the address format scheme normally uses the index as a first address mark. This could lead to user difficulties. A related problem exists for certain host systems which make use of the index mark during the reading of data as a guide that addresses are correctly positioned around a track. Clearly a unique index is required here also.

Unique index marks may be provided by discrete transducers, for example, inductive, capacitive, optical transducers. However these involve additional expense and assembly and the reliability decreases with additional components. Such devices have been known to fail after a relatively short time, which is a disadvantage.

An object of the present invention is to obviate or mitigate the abovesaid problem.

According to a first aspect of the present invention there is provided a method of generating a unique index mark from the commutation signal of a d.c. brushless motor comprising, sensing the commutation signal from the motor, dividing the frequency of the commutation signal to provide at least two index signals per revolution, providing at least one track on the disk surface on which magnetic signals synchronised to one of the index signals are stored, said synchronising signals being stored on a proportion of said at least one track, the other proportion of said at least one track being erased, said proportions being determined by the number of phases of the motor, sensing the synchronising signals on said at least one track and correlating the synchronising signals with one index signal to provide a unique index mark, the correlation providing the same unique index mark every revolution of the motor.

According to a second aspect of the present invention there is provided apparatus for generating a unique index mark from the commutation signal of a d.c. brushless motor comprising, at least one track on a disk surface in which magnetic signals are stored, said magnetic signals being stored on a proportion of said track, the other proportion of the track being erased, said proportions being determined by the number of phases of the motor, means for sensing the magnetic signals on said track, means for sensing the commutation signal from the brushless d.c. motor, processing means connected to said sensing means for processing said commutation signal to give two identical index signals, means for synchronising said magnetic signals on said track with one of said index signals whereby a unique index mark is produced, said synchronising means providing the same unique index mark every revolution.

Preferably said means for sensing the data on said track is a read/write head. Preferably also, said read/write head is controlled by a microprocessor.

Preferably also, said processing means and correlating means are combined in a multivibrator.

An embodiment of the present invention will now be described by way of example with reference to the accompanying drawings in which.

Figure 1A:
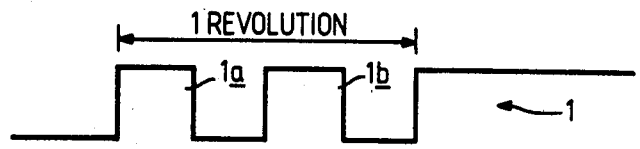
FIG. 1a is a commutation signal from a 2-phase brushless d.c. motor.
Figure 1B:
FIGS. 1b and 1c are two index signals derived from the signal of FIG. 1.
Figure 1C:
Figure 2:
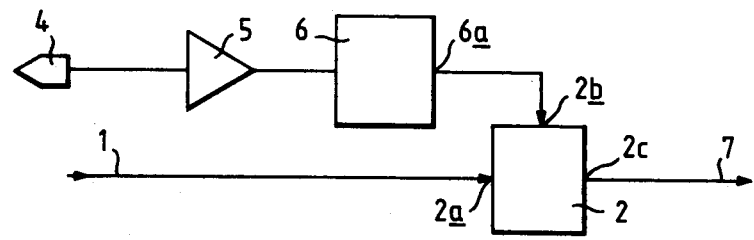
FIG. 2 is a schematic diagram of the apparatus according to the present invention.
Figure 3A:
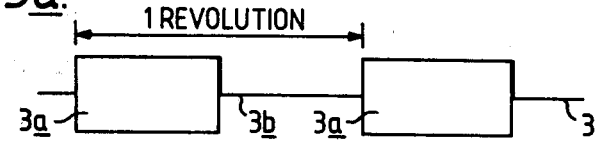
FIG. 3a, 3b is a diagram showing the relationship between the signal from the disk and the detector output respectively of the apparatus shown in FIG. 2.
Figure 3B:

Referring now to the drawings, a commutation signal 1 from a 2-phase brushless d.c. motor (not shown) is connected to an input 2a of a multivibrator or flip-flop 2, (FIG. 2). There are two pulses 1a and 1b generated per revolution (FIG. 1a). A signal synchronised to index "high" 1d is recorded on one half 3a of a track "—2" (not shown) on the disk surface which is not used for data recording. In normal computer disk files, the first track is known as track 0, the second track as track 1 and so on to the maximum towards the disk centre. In normal operating tracks occuring before track 0 (i.e. external tracks) are not normally accessible and are denoted as track "—1" (in this case a guard track), track "—2" and so on towards the disk periphery. The other half 3b of the track is left erased. This is shown diagrammatically in FIG. 3. The synchronising signal recorded on the one half of the track is called a 'data burst'. The data burst is a pattern of unformatted data written on the track. The synchronising signal may also be written on track "—3". A sensing head 4 for reading the track is connected to a detection comparator 5 the output 5a which in turn is connected to a microprocessor 6. The output 6a of the microprocessor is connected to a set input 2b on the flip-flop 2. The output 2c of the flip-flop provides the index mark 7 to the general signal processing circuitry which handles the transfer of data.

In use, at power-up of the device the microprocessor 6 steps the heads to the track "—2" on which the synchronising signal was previously recorded and looks for a data burst on head 4. The detection comparator 5 finds the data burst, the output of the comparator 5 being at logic zero when the burst is detected and being at logic "1" when erasure is detected. The output of the comparator 5 causes output of the microprocessor 6a which is the set input 2b of the flip-flop 2, to force the output 2c of the flip-flop "high," setting the initial condition. The microprocessor 6 sets the output of this flip-flop 2 such that it is synchronised with the detected data burst. Thus in our example, the waveform 1b always results thereafter, the high to low transitions being caused as before by the commutation signals 1 into the flip-flop 2. This results in a unique index mark. Failure to find the data burst on track "—2" due to inadvertent erasure say, results in the microprocessor seeking automatically to track "—3", and repeating the search. If no data burst is found the microprocessor flags an error code which indicates a fault condition in the operation. Track "—1" acts as a guard track. The microprocessor also has a physical hard-wire link which, if cut causes the system to override index selection since the application may not be suited to index marking. A suitable technique for using and detecting the synchronising signal is to write a pattern consisting of say, 10 individual data blocks each of short duration. relative to the time that index 1$d$ is high. Detection consists of counting the number of these blocks in each half revolution of the disk timed from the index edge and comparing the difference over several revolutions. The miroprocessor can then identify the half revolution of the disk in which the synchronising signal was recorded.

The data burst does not require to extend in time over half revolution. In fact, a delay is incorporated at the start and before the end of a half revolution to avoid tolerance problems where there may be uncertainty between the data burst and the index signals.

Modifications may be made to the appartus hereinbefore described without departing from the scope of the invention. For example the microprocessor may be replaced by digital logic components, and either index signal can be selected so long as the same signal is selected every revolution. Additionally, a brushless d.c. motor having 3 or more phases can be used, since the index signal is synchronised with the data burst. In this situation the proportion of data burst on the tracks "—2", "—3" requires to be correlated with the number of phases of the d.c. motor. For example, if a 3-phase motor was used ⅔ of the tracks "—2", "—3" would have a data burst signal, and if 4- phases were used ¼ of the tracks "—2", "—3" would have a data burst signal.

Advantages of the present invention include; there is no requirement to generate a unique index signal by a discrete transducer which is usually inductive, capacitive or optical, hence the present invention is more economic in terms of component and assembly cost; the present invention has increased reliability since fewer components are used, and the apparatus according to the present invention is adapted to be interfaced with or to use the same microprocessor of the stepper motor control circuit disclosed in European Patent Application No. 82302197.7. A further advantage of the invention is that this technique is subject to the same fault detection as all data transfers of the circuit

We claim:

1. A method of generating a unique index mark from the commutation signal of a d.c. brushless motor characterised by, sensing the commutation signal from the motor, dividing the frequency of the commutation signal to provide at least two index signals per revolution, providing at least one track on the disk surface on which magnetic signals synchronised to one of the index signals are stored, said synchronising signals being stored on a proportion of said at least one track, the other proportion of said at least one track being erased, said proportions being determined by the number of phases of the motor, and sensing the synchronising signals on said at least one track and correlating the synchronising signals with one index signal to provide a unique index mark, the correlation providing the same unique index mark every revolution of the motor.

2. Apparatus for generating a unique index mark from the commutation signal of a d.c. brushless motor characterised in that at least one track on the disk surface in which magnetic signals are stored, said magnetic signals being stored on a proportion of said track, the other proportion of the track being erased, said proportions being determined by the number of phases of the motor, means for sensing the magnetic signals on said track, means for sensing the commutation signal from the brushless d.c. motor, processing means connected to said sensing means for processing said commutation signal to give two identical index signals, means for synchronising said magnetic signal on said track with one of said index signals whereby a unique index mark is produced, said synchronising means providing the same unique index mark every revolution.

3. Apparatus as claimed in claim 2 characterised in that said means for sensing the data on said data track is a magnetic read/write head.

4. Apparatus as claimed in claim 2 or claim 3 characterised in that said means for synchronising is a microprocessor and is combined with said processing means which is a multivibrator, in a single unit.

* * * * *

UNITED STATES PATENT AND TRADEMARK OFFICE
CERTIFICATE OF CORRECTION

PATENT NO. : 4,392,095
DATED     : July 5, 1983
INVENTOR(S) : David S. Ruxton, et al.

It is certified that error appears in the above-identified patent and that said Letters Patent is hereby corrected as shown below:

```
On the title page, Item (75) "Alex" should read--
Alec--.

Item (73) "Rodine Limited" should read--
Rodime Limited--.
```

*Signed and Sealed this*

*Twentieth* Day of *August 1985*

[SEAL]

*Attest:*

DONALD J. QUIGG

*Attesting Officer*  *Acting Commissioner of Patents and Trademarks*